April 28, 1925.  1,535,367

T. P. LITTLE

ASSEMBLING DEVICE FOR TUBE END CLAMPS

Filed Nov. 19, 1923    2 Sheets-Sheet 1

INVENTOR.
Thomas P. Little
BY
Edward N. Taylor
ATTORNEY.

April 28, 1925.

T. P. LITTLE 1,535,367

ASSEMBLING DEVICE FOR TUBE END CLAMPS

Filed Nov. 19, 1923    2 Sheets-Sheet 2

INVENTOR.
Thomas P. Little
BY
Edward C. Taylor
ATTORNEY.

Patented Apr. 28, 1925.

1,535,367

UNITED STATES PATENT OFFICE.

THOMAS P. LITTLE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

ASSEMBLING DEVICE FOR TUBE-END CLAMPS.

Application filed November 19, 1923. Serial No. 675,650.

*To all whom it may concern:*

Be it known that I, THOMAS P. LITTLE, a citizen of the United States of America, residing at Chicopee Falls, in the county of Hampden and State of Massachusetts, have invented certain new and useful Improvements in an Assembling Device for Tube-End Clamps, of which the following is a specification.

In certain methods of making inner tubes for automobile tire casings the tube ends are clamped to the mandrel during vulcanization by clamps or cuffs such as are shown in my Patent No. 1,450,320, dated April 3, 1923. The present invention relates to apparatus for applying these clamps to the tube ends in a better and quicker manner than was possible under the old hand methods.

Referring to the drawings.

Figure 1:
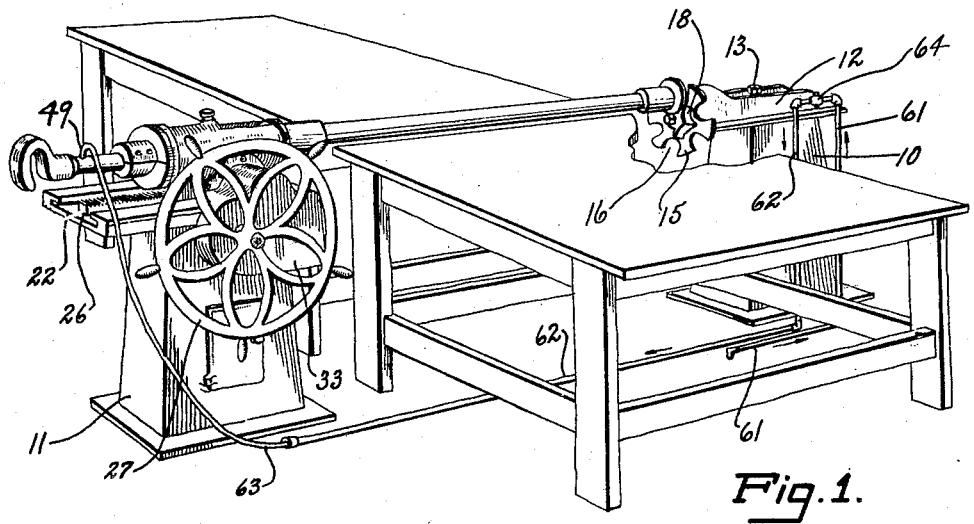
Fig. 1 is a perspective of the apparatus in use.

In my prior Patent 1,450,320 is described a method of preparing rubber tubes for vulcanization in which internally tapered sleeves or clamps are forced onto the ends of the vulcanizing mandrel so as to compress against it the ends of the tube mounted thereon. The clamps both seal the tube to the mandrel and skive the tube ends to assist in later splicing. In the original practice of this method the clamps were driven on manually, a yoke shaped driving hammer being used. The present apparatus is designed to expedite the application of these clamps, and to drive them into place with greater uniformity.

The device is shown in association with a table upon which the tubes may be rolled upon the mandrel or have any desired treatment given to them. Composing the device in consideration are standards 10 and 11, the one carrying a stationary mandrel supporting device serving also as a backing for one of the clamps and the other carrying a clamp driving mechanism. The standard 10 will be considered first.

The top of this standard is formed with a slideway in which a block 12 is adjustably secured by a bolt connection 13. Into one end of the block is screwed a stud 14, upon which is pivoted a disk 15 having a series of notches 16 around its periphery, each formed with a semi-circular bottom. The disk is held with any of the notches uppermost by a spring pressed detent 17 of any suitable design, mounted on the block and fitting into recesses in the back of the disk. The different notches are intended for tube mandrels of various sizes, the disk being arranged for accommodating any desired size of mandrel merely by withdrawing the detent temporarily and rotating the disk to the desired point. In the usual operation of the device the mandrel will extend beyond the ends of the tube sufficiently to rest in the notches. With certain sizes of tubes, however, the rubber extends so near the end of the mandrel that with the clamp loosely in place the mandrel does not extend through the clamp sufficiently for this purpose. For dealing with such tubes an additional support 18 is secured to the face of the disk and is provided with recesses 19 adapted to support the flanges 20 of the clamps 21. When the clamp is later driven on the mandrel will extend through the notch located directly over the recess 19.

The driving mechanism is located on standard 11 which is formed with a slideway 22. In this slideway runs a carriage 23 having a shaft 24 extending laterally through it and carrying a pinion 25. A rack 26 is attached to the standard 11 in engagement with the pinion. This constitutes a means for reciprocating the carriage back and forth as shaft 24 is rotated. Rotation of the shaft is controlled by a handwheel 27, having on its shaft 28 a gear 29 meshing with an idler gear 30, which in turn meshes with a gear 31 on the shaft 24 of pinion 25. Shafts 24 and 28, and the shaft 32 of the idler gear, are all supported from the carriage 23 in a bracket overhanging the top of the standard, and are preferably covered with a gear guard 33 for safety.

Figure 2:
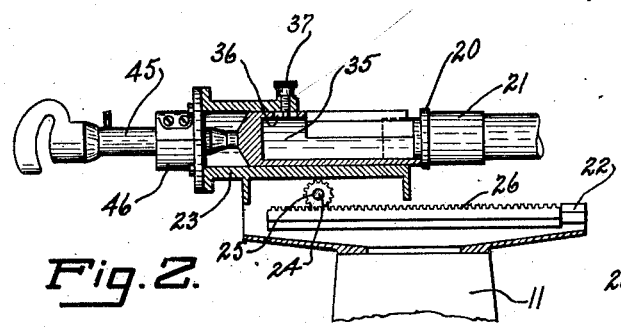
Fig. 2 is a longitudinal section through the pneumatic driving head, shown at the left in Fig. 1.
Figure 3:
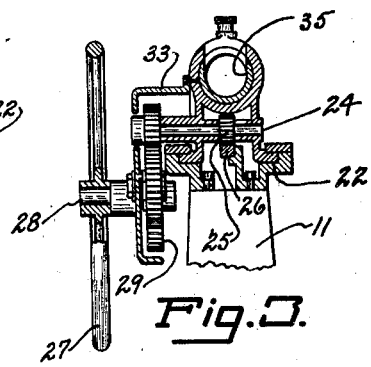
Fig. 3 is a view from the right in Fig. 2, partly broken away.
Figures 4, 5:
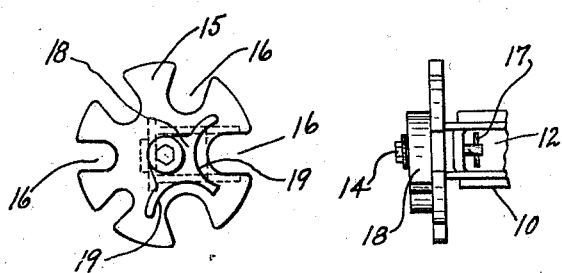
Fig. 4 is a front elevation of the supporting head.
Fig. 5 is a side elevation thereof.
Figure 6:
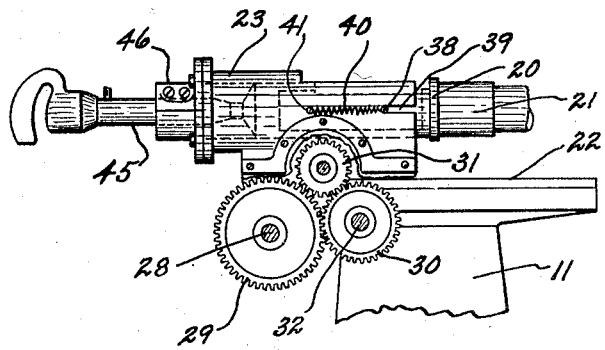
Fig. 6 is a side elevation of the driving head shown in Fig. 2, the gear guard appearing in Fig. 1 being removed, and a slight modification of the construction being shown.

The upper portion of the carriage is formed as a receptacle for a replaceable sliding sleeve 35 in which the end of the mandrel is carried. Two modes of securing the sleeves in place are shown, each permitting ready replacement of the sleeve when it is desired to change the size of mandrel being worked upon. The first mode is illustrated in Figs. 1, 2, and 3. According to it, the sleeve has a slot 36 into which fits the end of a thumbscrew 37, serving both to guide the sleeve for reciprocation in a straight line and to permit the sleeve to be removed at will by unloosening the thumbscrew. According to the second mode, which is shown in Fig. 6, pins 38 project from the side of the sleeve through open-ended slots 39 in the carriage. Springs 40, attached permanently to pins 41 on the carriage and removably to pins 38, keep the sleeve drawn back yieldingly into the carriage at all times except when forced out by the devices about to be described. Pins 38 insure that the sleeve shall have only straight line movement.

Also supported by the carriage 23 is a mechanism constructed to give a succession of sharp blows to the clamp 21 through sleeve 35, as this type of pressure has been found advantageous in the application of the clamps to the tube ends. As a preferred form of mechanism I employ a pneumatic hammer, which may be of any standard type. The barrel 45 of this pneumatic hammer is clamped at 46 to the carriage.

Figure 7:
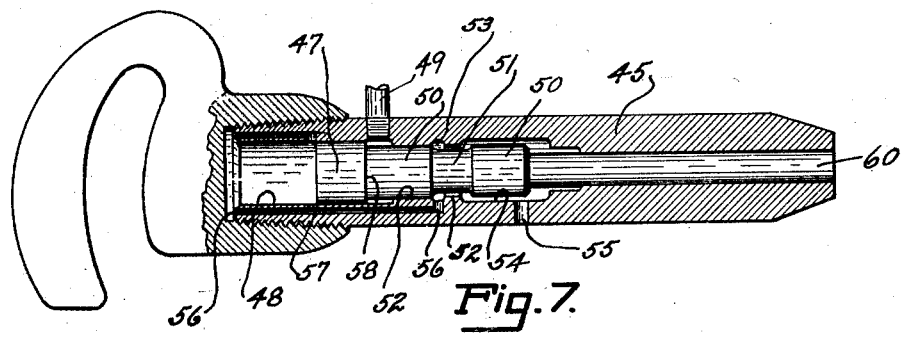
Fig. 7 is a longitudinal section, on an enlarged scale, of a part of the driving head.
Figures 8, 9:
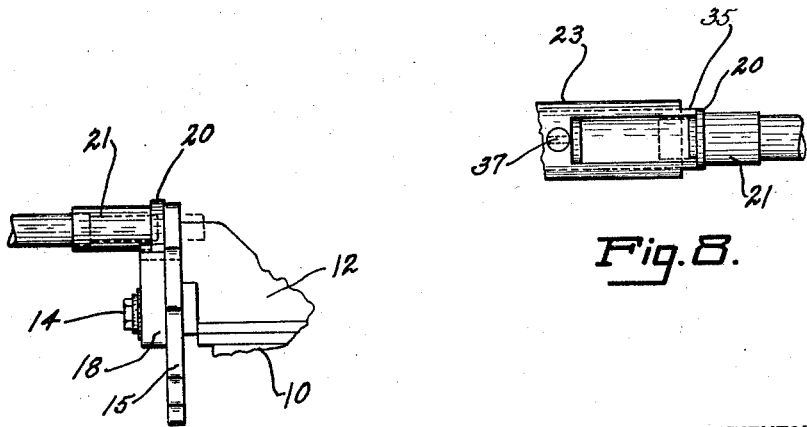
Fig. 8 is a detail section showing the co-operation of the tube and clamp with the driving head.
Fig. 9 is a similar view of the supporting head.

One standard pneumatic hammer is illustrated in longitudinal section in Fig. 7. This hammer is of the valveless type, and was chosen for illustrative purposes because of its simplicity. Any other type would serve as well. The barrel 45 of the hammer is chambered to receive a piston which serves as the movable hammering agent. The rear 47 of the piston is of large diameter, running snugly in a bore 48 in the barrel. Into the forward end of this bore the air pipe 49 leads. The remainder of the piston may be considered as of a uniform diameter 50, being separated into two portions by a turned down portion 51. These portions run snugly in a bore likewise separated into two portions by an annular recess 53, and terminating at its forward end in an enlarged bore 54 from which the exhaust vent 55 leads. An air passage 56 connects recess 53 with the rear end of the bore 48, connecting also with bore 48 through a port 57 spaced somewhat forward.

The operation of the illustrated form of hammer may now be described. With the piston (as shown) near the forward end of its travel, the air admitted through pipe 49 (continuously as long as the hammer is to operate) will press on the shoulder 58 formed between the two parts 47 and 50 of the piston, forcing the piston rearwardly. Bore 48 is at this time vented to the exhaust 55 through passage 56, recess 53, and the space between the turned down portion 51 of the piston and the neck 52 between recess 53 and bore 54. As the piston proceeds to the rear the forward part of portion 50 of the piston will run into neck 52, cutting off this vent. After a slightly further travel port 57 will be uncovered by the passage over it of shoulder 58. This connects bore 48 directly with the air pipe 49 through port 59 and the rear part of air passage 56, the venting connection between the bore 48 and the exhaust being meanwhile closed as above described. The air pressure on the large end surface of the piston checks its rearward motion and sends the piston forward with high velocity. The air supply to chamber 48 is cut off as port 57 is again covered up by the forward movement of the piston, but the effect of the air pressure continues until the venting of bore 48 is again established shortly before the piston reaches the position shown in the figure. If the air is left turned on the hammer will deliver in rapid succession a series of blows on a rod 60 sliding freely through the barrel and adapted to contact at its forward end with the end of sleeve 35.

The usual trigger control for air hammers may be employed, but I have found it more convenient to operate the hammer from the opposite side of the table, as it divides the operations more evenly between the workmen. The main air inlet pipe is shown at 61 in Fig. 1, connecting through a pipe 62 with the flexible tube 63 which connects with the hammer barrel at 49. A valve 64 is interposed between pipes 61 and 62 at a convenient place for operation, being preferably of the push button type which will shut off the air supply automatically as soon as the operator releases it.

The manner of employing the device in the application of clamps will now be considered. With the carriage backed off to the position of Fig. 2 a mandrel, with clamps loosely applied at each end, is supported between disk 15 and sleeve 35. Handwheel is now rotated to cause the disk and sleeve to engage the flanges 20 of the clamps, and air is simultaneously admitted to the air cylinder to cause a rapid succession of blows to be delivered to the clamp through sleeve 35. The clamps on both ends of the tube are forced on by this method substantially simultaneously, motion being transmitted through the mandrel to the clamp resting against disk 15. As the clamps are forced onto the tubes carriage 23 is advanced by turning the handwheel to keep the clamps tightly pressed between the sleeve and the disk. After a sufficient degree of tightness has been attained the air is shut off, carriage 23 backed off, and the mandrel lifted out of the sleeve and the recesses in the disk.

Having thus described my invention, I claim:

1. A machine for applying sliding clamps to rubber tubes on mandrels, comprising means for supporting a mandrel with the clamps loosely applied thereto, and mechanism for driving the clamps towards each other on the tube with a series of sharp blows.

2. A machine for applying sliding clamps to rubber tubes on mandrels, comprising means for supporting a mandrel with the clamps loosely applied thereto, an abutment against which the clamp at one end may be pressed, and mechanism for striking a series of sharp blows against the clamp at the other end.

3. A machine for applying sliding clamps to rubber tubes on mandrels, comprising means for supporting a mandrel with the clamps loosely applied thereto, an abutment against which the clamp at one end may be pressed, and a vibrating pneumatic hammer for striking a series of sharp blows against the clamp at the other end.

4. A machine for applying sliding clamps to rubber tubes on mandrels, comprising means for supporting a mandrel with the clamps loosely applied thereto, an abutment against which the clamp at one end may be pressed, a sliding carriage adjacent the other end of the tube, and mechanism traveling with the carriage for striking a series of sharp blows against the clamp at the second end of the tube.

5. A machine for applying sliding clamps to rubber tubes on mandrels, comprising an abutment for supporting and holding the clamp at one end, a sliding carriage adjacent the other end of the tube, an abutment on the carriage for supporting the clamp at that end, and mechanism for transmitting a series of sharp blows through the second-named abutment.

THOMAS P. LITTLE.